United States Patent
Anderson et al.

(10) Patent No.: US 12,441,649 B2
(45) Date of Patent: Oct. 14, 2025

(54) OPTICAL FIBER DRAW FURNACE SYSTEM AND METHOD

(71) Applicant: CORNING INCORPORATED, Corning, NY (US)

(72) Inventors: Erling Richard Anderson, Wilmington, NC (US); Tammy Michelle Hoffmann, Wilmington, NC (US); Nikolaos Pantelis Kladias, Horseheads, NY (US); Kenneth William Roberts, Wilmington, NC (US); Eric Wade Thornton, Wilmington, NC (US); Chunfeng Zhou, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 243 days.

(21) Appl. No.: 17/706,976

(22) Filed: Mar. 29, 2022

(65) Prior Publication Data

US 2022/0315473 A1    Oct. 6, 2022

Related U.S. Application Data

(60) Provisional application No. 63/171,302, filed on Apr. 6, 2021.

(51) Int. Cl.
*C03B 37/029* (2006.01)
*C03B 37/025* (2006.01)

(52) U.S. Cl.
CPC ........ *C03B 37/029* (2013.01); *C03B 37/0253* (2013.01); *C03B 2205/98* (2013.01)

(58) Field of Classification Search
None
See application file for complete search history.

(56) References Cited

U.S. PATENT DOCUMENTS

| | | |
|---|---|---|
| 4,126,436 A | 11/1978 | Bailey |
| 5,637,130 A | 6/1997 | Nagayama et al. |
| 6,668,592 B1 | 12/2003 | Taru et al. |

(Continued)

FOREIGN PATENT DOCUMENTS

| | | | |
|---|---|---|---|
| EP | 2803643 B1 | 4/2018 | |
| JP | 07033471 A * | 2/1995 | ....... C03B 37/02736 |

(Continued)

OTHER PUBLICATIONS

JP-07033471-A Machine Translation by Clarivate Analytics Retrieved Feb. 20, 2024. (Year: 2024).*

(Continued)

*Primary Examiner* — Lisa L Herring
(74) *Attorney, Agent, or Firm* — Amy T. Lang

(57) ABSTRACT

An optical fiber draw furnace system including a muffle, a downfeed handle, and a downfeed handle extension portion. The downfeed handle is moveably disposed within an inner cavity of the muffle. The downfeed handle extension portion is connected to the downfeed handle and moveably disposed within the inner cavity of the muffle. Furthermore, the downfeed handle extension portion forms a first gap between an outer surface of the downfeed handle extension portion and an inner surface of the muffle, the first gap having a length in a range of about 0.001 m to about 0.2 m.

16 Claims, 13 Drawing Sheets

(56) References Cited

U.S. PATENT DOCUMENTS

| | | |
|---|---|---|
| 10,611,670 B2 | 4/2020 | Raki et al. |
| 11,198,636 B2 | 12/2021 | Anderson et al. |
| 2013/0298501 A1 | 11/2013 | Nummela et al. |
| 2019/0292090 A1 | 9/2019 | Anderson et al. |
| 2020/0002213 A1 | 1/2020 | Yoshikawa |
| 2020/0199009 A1 | 6/2020 | Konishi et al. |
| 2021/0230044 A1 | 7/2021 | Hoffmann et al. |
| 2022/0002182 A1 | 1/2022 | Anderson et al. |

FOREIGN PATENT DOCUMENTS

| | | |
|---|---|---|
| JP | 2011-084409 A | 4/2011 |
| WO | 2021/231511 A1 | 11/2021 |

OTHER PUBLICATIONS

International Search Report and Written Opinion of the International Searching Authority; PCT/US2022/023232; mailed on Sep. 16, 2022, 19 pages; European Patent Office.

Invitation to Pay Additional Fees and, Where Applicable, Protest Fee; PCT/US2022/023232; dated Jul. 19, 2022, 13 pages; European Patent Office.

\* cited by examiner

OPTICAL FIBER DRAW FURNACE SYSTEM AND METHOD

This Application claims the benefit of priority to U.S. Provisional Patent Application Ser. No. 63/171,302 filed on Apr. 6, 2021, the content of which is relied upon and incorporated herein by reference in its entirety.

FIELD OF THE DISCLOSURE

The present invention is generally directed to systems and methods for operating an optical fiber draw furnace, and more particularly relates to systems and methods for operating an optical fiber draw furnace with a reduced open cavity within the draw furnace.

BACKGROUND OF THE DISCLOSURE

Optical fibers are generally manufactured to include an inner glass core surrounded by a glass cladding and multiple layers of coatings to provide sufficient bending and damage resistance. Conventional techniques and manufacturing processes for producing optical fibers include drawing an optical fiber from a preform. The preform is formed of consolidated silica glass, which includes a series of concentric regions of silica glass that differ in the level or type of dopant. Control of the spatial distribution, concentration, and/or type of dopant in the preform creates regions that differ in refractive index. These differences in refractive index define different functional regions in the produced optical fiber (e.g. core vs. cladding, low index depressions, tailored index profiles).

Drawing of the preform is typically performed in a draw furnace and involves melting and stretching the preform to achieve a target optical fiber diameter. Various properties, including furnace temperature, preform position, and pulling speed, are controlled in order to produce an optical fiber with a constant diameter. For example, temporal variation in the temperature of the furnace can cause variation in the cooling rate of the preform during the drawing procedure, resulting in an uneven and irregular optical fiber diameter.

Furthermore, unsteady convection of gases within the draw furnace can lead to an uneven and irregular optical fiber diameter. Inert process gas is typically introduced into an upper portion of the draw furnace in order to prevent ambient air from entering the furnace. But, flow instabilities in the process gas can affect uniform drawing of the preform. More specifically, flow instabilities in the process gas can affect the heat transfer between the process gas and the neckdown region of the preform, which in turn leads to fluctuations in cooling rate of the preform, resulting in diameter fluctuations of the drawn optical fiber.

Conventional inert process gases include nitrogen and argon. But these gases can cause the undesired flow instabilities in the draw furnace. Helium gas is known to reduce any unsteady convection in a draw furnace and, thus, has been used in place of nitrogen and argon to provide more uniform diameters in the drawn optical fibers. However, helium is a nonrenewable resource recovered as a byproduct from natural gas wells. The price of helium is projected to increase in the future, thus increasing the need to use other gases in the draw furnace. Therefore, there is a need to provide systems and methods for operating a draw furnace without having to necessarily use helium while still maintaining a steady gas convection within the draw furnace.

SUMMARY OF THE DISCLOSURE

Embodiments of the present disclosure reduce the open annular volume within a muffle of a draw furnace, as compared with conventional draw furnaces, which provides a steady gas convection within the draw furnace, even when using nitrogen or argon as the process gas. Therefore, the embodiments of the present disclosure provide uniformly drawn optical fibers without relying on helium gas as the process gas.

According to one embodiment, an optical fiber draw furnace system is provided that comprises a muffle, a downfeed handle, and a downfeed handle extension portion. The downfeed handle and the downfeed handle extension portion are both moveably disposed within an inner cavity of the muffle. Furthermore, the downfeed handle is connected to the downfeed handle extension portion. And, the downfeed handle extension portion forms a first gap between an outer surface of the downfeed handle extension portion and an inner surface of the muffle, the first gap having a length in a range of about 0.001 m to about 0.2 m.

According to another embodiment, an optical fiber draw furnace system is provided that comprises a muffle, a downfeed handle, a preform attachment member, and a downfeed handle extension portion. The downfeed handle is moveably disposed within an inner cavity of the muffle. The preform attachment member is connected to the downfeed handle and is configured to directly connect to an optical fiber preform. Furthermore, the downfeed handle extension portion is disposed radially outward of the preform attachment member. And, the downfeed handle extension portion is moveable with respect to the preform attachment member from a first position, in which at least a bottom portion of the preform attachment member is exposed and not covered by the downfeed handle extension portion, to a second position, in which the bottom portion of the preform attachment member is radially covered by the downfeed handle extension portion.

According to another embodiment, a method of operating an optical fiber draw furnace system is provided. The method comprises injecting a process gas into an inner cavity of a muffle. The method also comprises moving a downfeed handle and a downfeed handle extension portion within the inner cavity while drawing an optical fiber preform. The downfeed handle extension portion forming a first gap between an outer surface of the downfeed handle extension portion and an inner surface of the muffle, the first gap having a length in a range of about 0.001 m to about 0.2 m.

DETAILED DESCRIPTION

Figure 1:
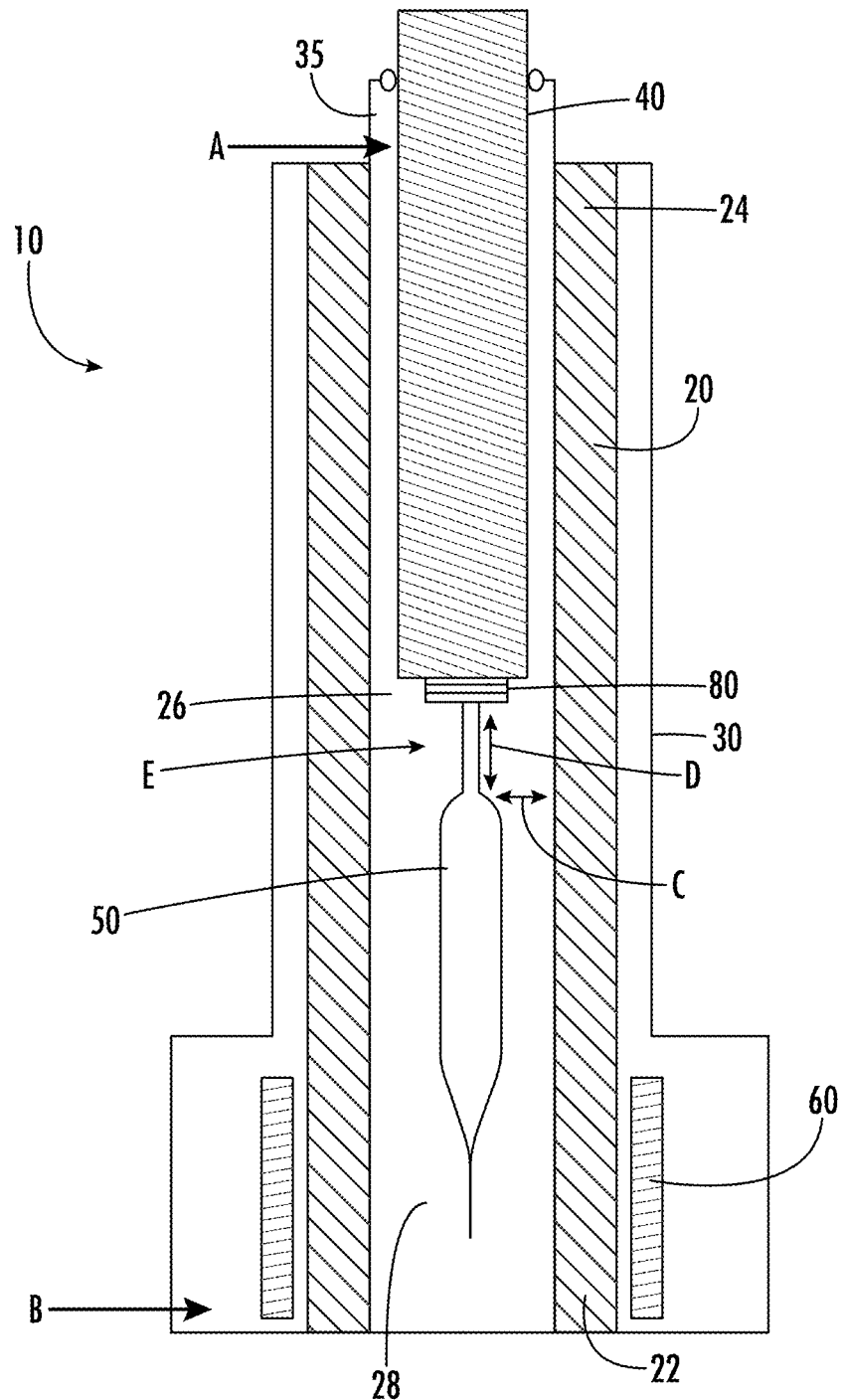
FIG. 1 is a schematic diagram illustrating a conventional draw furnace assembly.

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

It is also important to note that the construction and arrangement of the elements of the disclosure, as shown in the exemplary embodiments, is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel and nonobvious teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present disclosure. Other substitutions, modifications, changes, and omissions may be made in the design, operating conditions, and arrangement of the desired and other exemplary embodiments without departing from the spirit of the present disclosure.

FIG. 1 shows a conventional optical fiber draw furnace system 10, which includes a muffle 20 disposed within an outer can 30. A downfeed handle 40 is moveably positioned within an inner cavity 26 of muffle 20 to support an optical fiber preform 50.

Muffle 20 is a tubular member that comprises a first end portion 22 and a second end portion 24, as shown in FIG. 1. A top hat 35 is positioned above second portion 24 of muffle 20 and provides sealing capabilities with muffle 20 and downfeed handle 40, as is known in the art. As shown in FIG. 1, muffle 20 and top hat 35 form inner cavity 26, through which downfeed handle 40 is moveably disposed during drawing of preform 50.

A heater 60 is disposed within outer can 30 adjacent to first end portion 22 of muffle 20. Inner cavity 26 forms a furnace cavity 28 near heater 60, such that heater 60 creates a hot zone within furnace cavity 28. The heat of the hot zone decreases the viscosity of preform 50 to draw preform 50 into an optical fiber. Preform 50 is attached to and hung from downfeed handle 40 using a support member, such as a boule 80.

As discussed above, process gas is injected into muffle 20 during the drawing of preform 50. More specifically, during the drawing process, process gas is injected into cavity 26 through gas inlet ports A and/or B. In traditional draw furnace systems, such as system 10, nitrogen and/or argon process gas is subject to flow instabilities as it flows within the furnace during a drawing procedure. As discussed above, such flow instabilities in the process gas cause an uneven and irregular diameter in the drawn optical fiber. The flow instabilities arise from unsteady natural convection due to density stratification in the muffle cavity and due to the flow of the process gas, which are propagated downward through the muffle. These flow instabilities ultimately affect the heat transfer between the process gas and a draw root of optical fiber preform 50. More specifically, the flow instabilities of the process gas are manifested as temperature variations, pressure variations, and mass flow variations within the muffle that are translated to the draw root of the optical fiber. The temperature, pressure, and mass flow variations lead to fluctuations in the heating and cooling of the draw root. This results in fluctuations of the diameter of the optical fiber drawn from preform 50 (e.g., due to changes in the amount of material which may be pulled from the optical fiber preform for a given speed and tension).

The flow instabilities, or unsteadiness, of the process gas can be quantified by a Grashof (Gr) number. The Gr number is interpreted physically as the ratio of the buoyancy forces to the viscous forces of a gas system. When buoyancy forces become significantly larger than the viscous forces, flow becomes unstable and temporally-variant. The Grashof number is expressed numerically by equation (1):

$$Gr = \frac{g\beta L_c^3 \Delta T}{v^2} \tag{1}$$

where, g is the gravitational acceleration, $\beta$ is the coefficient of thermal expansion of the process gas, $L_c$ is the characteristic length (e.g., the length of the space in which the gas is disposed), $\Delta T$ is the temperature difference (e.g. as measured proximate the draw root of the optical fiber preform) and v is the kinematic viscosity of the process gas.

As discussed above, some draw furnaces use helium as the process gas because it has a high kinematic viscosity. As can be seen from equation (1), a high kinematic viscosity of the process gas leads to a lower Grashof number, which results in steady, time-invariant natural convection flow. Stated another way, process gases with higher kinematic viscosity resist unsteady buoyancy-driven flow. Thus, the higher the kinematic viscosity of the process gas, the more resistant it is to buoyancy-driven flow, thus decreasing or preventing unsteady flow instabilities in the muffle. Generally, a Grashof number from about 7,000 or less, 8,000 or less, 9,000 or less, 10,000 or less, 11,000 or less, or 12,000 or less results in stable, time-invariant flow, while a Grashof number greater than about 13,000 results in unsteady, time-variant flow.

As shown in FIG. 1, as preform 50 is consumed during the draw process in the conventional system 10, the diameter of preform 50 decreases, resulting in an increased gap C between a shoulder of preform 50 and an inner wall of muffle 20. Additionally, as preform 50 is consumed, it also results in an increased gap D between the shoulder of preform 50 and a bottom surface of support member 80. Gaps C and D only increase during the course of the draw process. As gaps C and/or D increase, it results in an increase in annular volume of space E, such that space E is defined by the shoulder of preform 50, the inner wall of muffle 20, and the bottom surface of support member 80. Such an increase in the annular volume of space E increases unsteady convection of the nitrogen and/or argon process gas in this area. More specifically, the increase in the annular volume of space E increases the length $L_c$ of equation (1) above, which increases the Grashof number.

Figure 2:
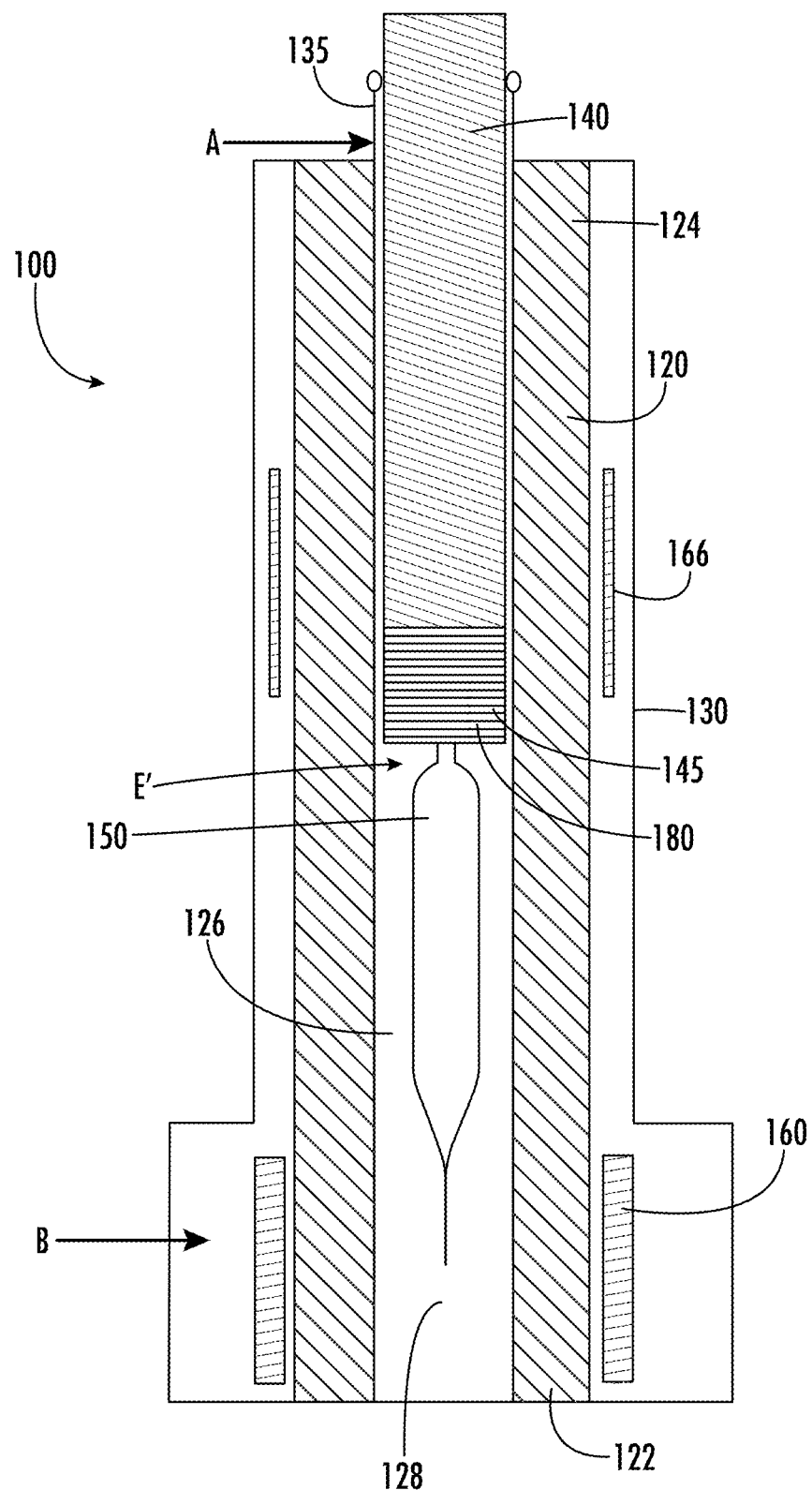
FIG. 2 is a schematic diagram illustrating a draw furnace assembly, according to embodiments of the present disclosure.

Embodiments of the present disclosure reduce this open annular volume, which decreases any unsteady convection of the process gas in space E (even when using nitrogen and/or argon as the process gas). With reference to FIG. 2, embodiments of the present disclosure include a draw furnace system 100 comprising a downfeed handle 140 slidingly disposed within a cavity 126 formed by a muffle 120 and a top hat 135. As is known in the art, top hat 135 provides sealing capabilities with muffle 120 and downfeed handle 140. Muffle 120 has a first end portion 122 and a second end portion 124. First end portion 122 is positioned near lower heater 160 and forms a furnace cavity 128. Second end portion 124 is positioned near top hat 135. Furthermore, downfeed handle 140 is connected to a downfeed handle extension 145, as discussed further below.

Lower heater 160 is configured to heat muffle 120 to create a hot zone within furnace cavity 128. The hot zone may have a temperature of about 1800° C. or greater, or about 1900° C. or greater, or about 2000° C. or greater or about 2100° C. or greater, or in a range from about 1800° C. to about 2100° C. As will be explained further below, the heat of the hot zone is sufficient to decrease the viscosity of preform 150 for drawing purposes.

Furthermore, muffle 120 is configured to retain heat within draw furnace 100, as well as protect other components from excess temperatures. For example, muffle 120 may have insulating properties sufficient to maintain the elevated temperature of the hot zone within furnace cavity 128. It is also contemplated that, for example, an insulation (not shown) surrounds muffle 20 to provide additional insulation features. Muffle 120 may be comprised of a refractory material such as, for example, graphite, zirconia, binders, alumina, mullite, quartz, silicon carbide, silicon nitride, and/or combinations thereof.

As shown in FIG. 2, muffle 120 and downfeed handle 140 are disposed within an outer can 130 of draw furnace 100. Outer can 130 may include one or more gas inlet ports (e.g., A and B) to inject the process gas into cavity 126, as discussed above. In some embodiments, the process gas is nitrogen gas and/or argon gas.

In the embodiment of FIG. 2, downfeed handle extension portion 145 is a support member 180 that is configured to support perform 50. Thus, preform 150 is directly connected to and hung from downfeed handle 140 using support member 180, which, in some embodiments, is a boule. It is contemplated that support member 180 is a component of downfeed handle 140, or is a separate component coupled to downfeed handle 140. Downfeed handle 140 may be formed of, for example, quartz glass, graphite, silicon nitride, silicon carbide, silicon carbide coated graphite, or combinations thereof. Support member 180 is configured to support preform 150 and, in some embodiments, is a piece of glass welded to downfeed handle 140. Additionally or alternatively, support member 80 includes a slot to which preform 150 is supported from. For example, preform 150 may be hung from the slot of support member 180. However, it is also contemplated that support member 180 may have any suitable configuration to attach preform 150 to downfeed handle 140.

Downfeed handle 140 and support member 80 each have an outer diameter smaller than an inner diameter of muffle 120. Thus, downfeed handle 40 and support member 180 are moveable within muffle 120 (within cavity 126) along a longitudinal direction of muffle 120 (e.g., up and down). Additionally, downfeed handle 140 and support member 180 may be moveable within muffle 120 in a radial direction such that downfeed handle 140 and support member 180 are rotatable within muffle 120. Downfeed handle 140 and support member 180 are moveable together with respect to muffle 20.

Preform 150, when attached to support member 180, moves with downfeed handle 140 within muffle 120. For example, during a drawing process, downfeed handle 140 moves longitudinally within cavity 126 as preform 150 is consumed. More specifically, preform 150 moves with downfeed handle 140 within muffle 120 and is lowered towards lower heater 160. When preform 150 enters the hot zone of furnace cavity 128, preform 150 is heated by lower heater 160 such that its viscosity lowers and the optical fiber may be drawn. The optical fiber is drawn out through a bottom of draw furnace 100 and may be wound onto a spool. In some embodiments, the optical fiber has a diameter of about 125 microns.

Preform 50 may be composed of any well-known glass or other material and may be doped suitable for the manufacture of optical fibers. In some embodiments, preform 50 includes a core and a cladding.

As shown in FIG. 2, both downfeed handle 140 and support member 180 (downfeed handle extension portion 145) have a larger outer diameter compared with traditional draw furnaces (such as the traditional drawn furnace 10 of FIG. 1). Additionally, support member 180 has a longer length compared with traditional draw furnaces (such as the traditional draw furnace 10 of FIG. 1). As discussed further below, these attributes advantageously reduce the annular volume of space E', thus decreasing unsteady convection of process gas in this area.

Figure 3:
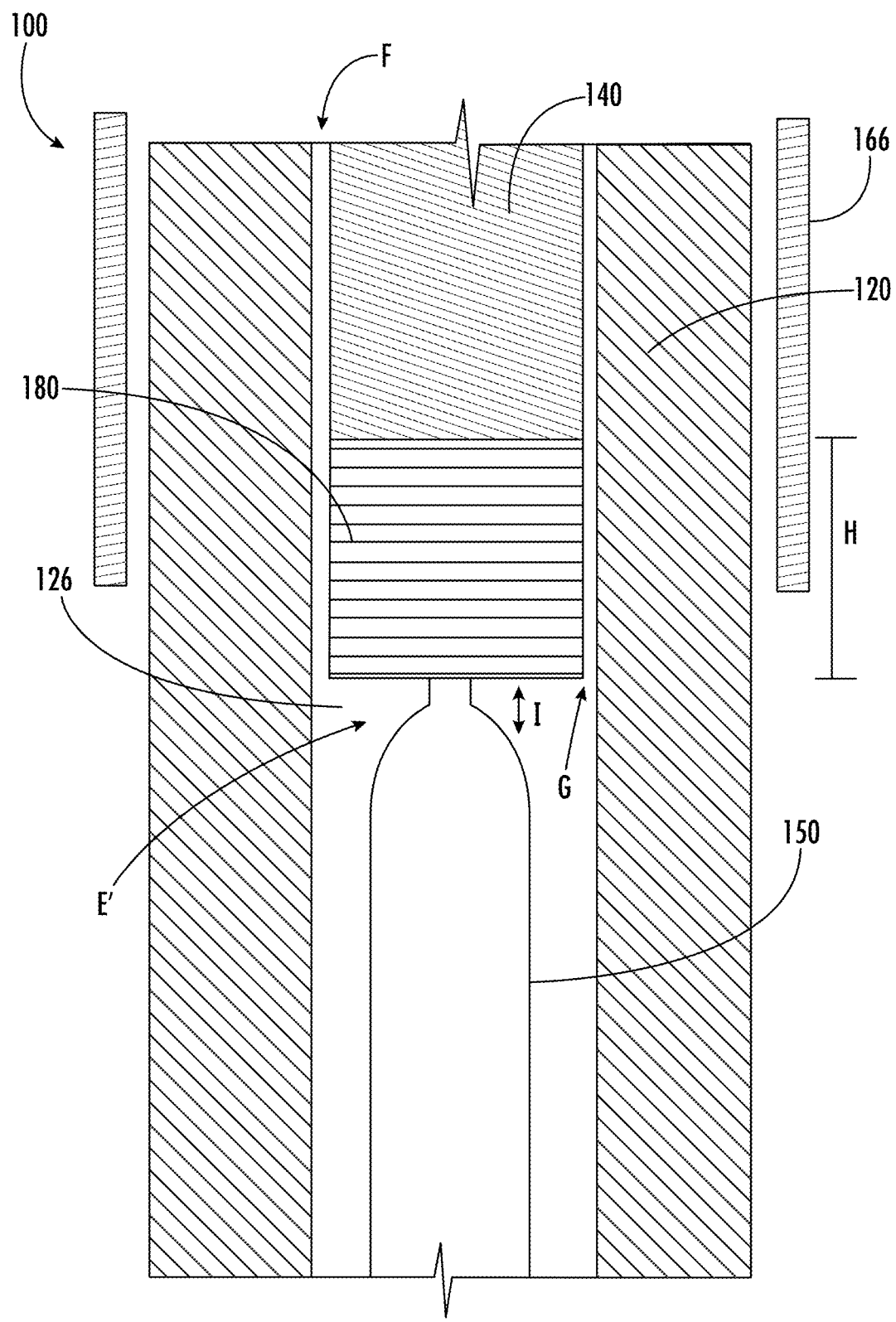
FIG. 3 is a schematic diagram showing an enlarged portion of the draw furnace assembly of FIG. 2, according to embodiments of the present disclosure.

FIG. 3 is an enlarged view of a portion of draw furnace 100 of FIG. 2. As shown in FIG. 3, support member 180 has substantially the same outer diameter as downfeed handle 140. Therefore, a gap F between an outer diameter of downfeed handle 140 and an inner diameter of muffle 120 is substantially equal to a gap G between an outer diameter of support member 180 and the inner diameter of muffle 120. In some embodiments, gap F and gap G each have a length (shortest distance between the outer surface of downfeed handle 140/support member 180 and the inner surface of muffle 120) of about 0.001 m to about 0.2 m, or about 0.005 m to about 0.15 m, or about 0.01 m to about 0.1 m, or about 0.03 m to about 0.08 m, or about 0.04 m to about 0.05 m. In other embodiments, gap F has a different length from gap G.

The outer diameters of downfeed handle 140 and support member 180 (downfeed handle extension portion 145) are each in a range from about 2 inches to about 20 inches, or about 3 inches to about 15 inches, or about 4 inches to about 8 inches, or about 5 inches to about 6 inches, or about 5.62 inches, or about 5.66 inches, or about 5.68 inches. In some embodiments, downfeed handle 140 and support member 180 have the same (or substantially the same) outer diameters. However, it is also contemplated that downfeed handle 140 and support member 140 may have different outer diameters.

Downfeed handle 140 has a length ranging from about 50 inches to about 200 inches, or about 70 inches to about 150 inches, or about 80 inches to about 120 inches. In some embodiments, the length of downfeed handle 140 is about 100 inches, or about 102 inches, or about 109 inches, or about 110 inches. Downfeed handle 140 may be longer in length than preform 150. Support member 180 has a length H ranging from about 2 inches to about 25 inches, or about 5 inches to about 20 inches, or about 8 inches to about 15 inches. In some embodiments, the length H is about 5.5 inches, or about 8 inches, or about 9 inches, or 18 about inches.

Furthermore, when preform 150 is positioned in system 100 (for example, as shown in FIG. 3), a gap I between a lower surface of support member 180 and the shoulder of preform 150 is in a range from about 0.001 m to about 0.2 m, or about 0.005 m to about 0.15 m, or about 0.01 m to about 0.1 m, or about 0.03 m to about 0.08 m, or about 0.04 m to about 0.05 m. In comparison with the traditional draw furnace 10 of FIG. 1, gap I is significantly smaller.

As discussed above support member 180 has a larger outer diameter compared with traditional draw furnaces (such as draw furnace 10 of FIG. 1). Additionally, in some embodiments, support member 180 also has a longer length compared with traditional draw furnaces (such as draw furnace 10 of FIG. 1). Such reduces the open annular volume of space E', wherein space E' is defined by the shoulder of preform 150, the inner wall of muffle 120, and the bottom surface of support member 180 (downfeed handle extension 145). It is noted that the annular volume of space E' of the embodiments of the present disclosure is significantly less as compared with the annular volume of space E of FIG. 1. For example, the volume of space E in the traditional draw furnace 10 is about 200 cubic inches, whereas the volume of space E', in some embodiments, is about 50 cubic inches, a volume reduction of about 4×. Such a reduction in the annular volume reduces unstable convection of the process gas within muffle 120, when nitrogen gas and/or argon gas are used as the process gas. The volume of space E' is about 100 cubic inches or less, or about 75 cubic inches or less, or about 50 cubic inches or less, or about 25 cubic inches or less. Additionally or alternatively, the volume of space E' is about 10 cubic inches or greater, or about 20 cubic inches or greater, or about 30 cubic inches or greater, or about 40 cubic inches or greater, or about 50 cubic inches or greater. In some embodiments, the volume E' is in a range from about 25 cubic inches to about 75 cubic inches, or about 30 cubic inches to about 70 cubic inches, or about 40 cubic inches to about 60 cubic inches.

Process gas (such as nitrogen gas and/or argon gas) is injected into muffle 120 during the drawing of preform 150. Although the process gas does not have a high kinematic viscosity, as compared to helium gas, the embodiments of the present disclosure decrease or prevent unsteady flow instabilities of the process gas in muffle 120. For example, the embodiments of the present disclosure provide a Grashof number of about 5 even when using nitrogen gas and/or argon gas as the process gas). This Grashof number is significantly less compared to a Grashof number of about 2100 in the traditional draw furnace 10 of FIG. 1. Thus, system 100 provides a cost saving system that does not rely on helium while still proving a steady convection of process gas, which provides an even and uniformly drawn optical fiber. However, it is also contemplated that system 100 can be used with helium as the process gas.

Furthermore, system 100 may include an upper heater 166 to heat muffle cavity 126 near a top end portion of preform 50. More specifically, as shown in FIG. 3, upper heater 166 is configured to heat the gap F (between downfeed handle 140 and muffle 120) and the gap G (between support member 180 and muffle 120). In some embodiments, upper heater 166 heats the process gas within gap F and/or gap G to a temperature within a range of about 600° C. or greater, about 700° C. or greater, about 800° C. or greater, about 900° C. or greater, or about 1000° C. or greater.

It is noted that the increased diameters of downfeed handle and support member 180 and, thus the reduced size of gaps F and G, as compared with traditional draw furnaces, helps to reduce any temperature variation in the process gas as it flows downward within muffle 120. Thus, the reduced size of gaps F and G reduces the reliance of system 100 on upper heater 166, as compared with traditional draw furnaces. More specifically, the reduction in size of gaps F and G (as compared with traditional draw furnaces), reduces the length $L_c$ of equation (1) above, which decreases the Grashof number. Therefore, a lower temperature is needed to maintain the process gas at a steady convection.

Furthermore, the extended length of support member 180 (downfeed handle extension portion 145) provides a smaller gap I between a lower surface of support member 180 and the shoulder of preform 150. This reduced gap I also reduces the length $L_c$ of equation (1) above, thus decreasing the Grashof number.

Figure 4A:
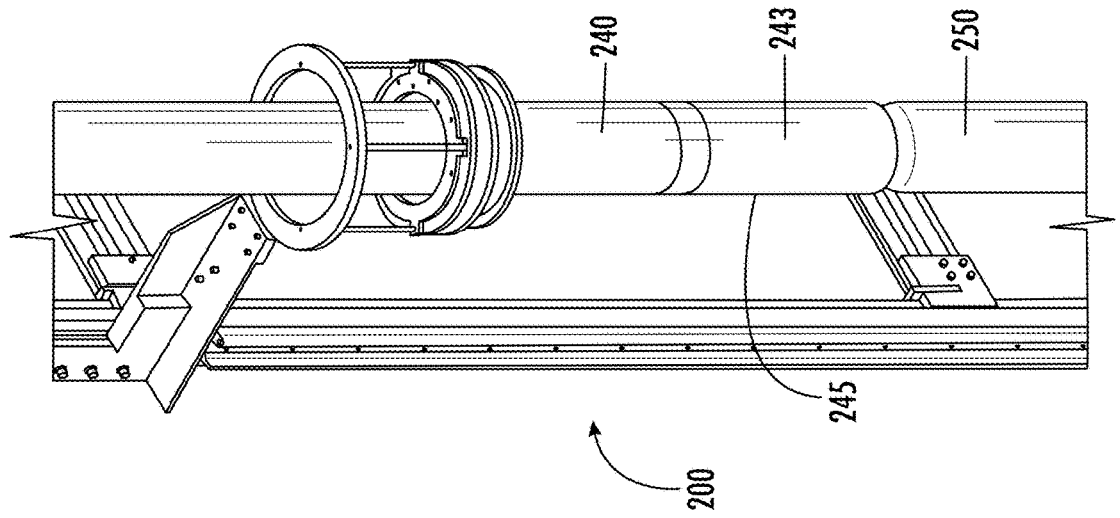
FIG. 4A is a schematic diagram illustrating a draw furnace assembly in a first position, according to embodiments of the present disclosure.
Figure 4B:
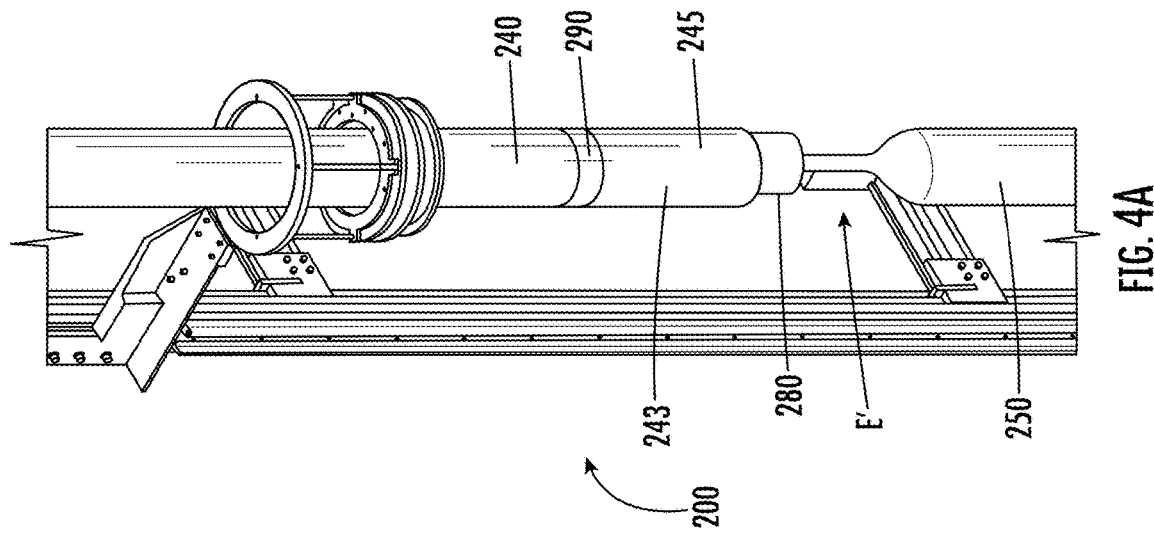
FIG. 4B is a schematic diagram illustrating the draw furnace assembly in a second position, according to embodiments of the present disclosure.
Figure 4C:
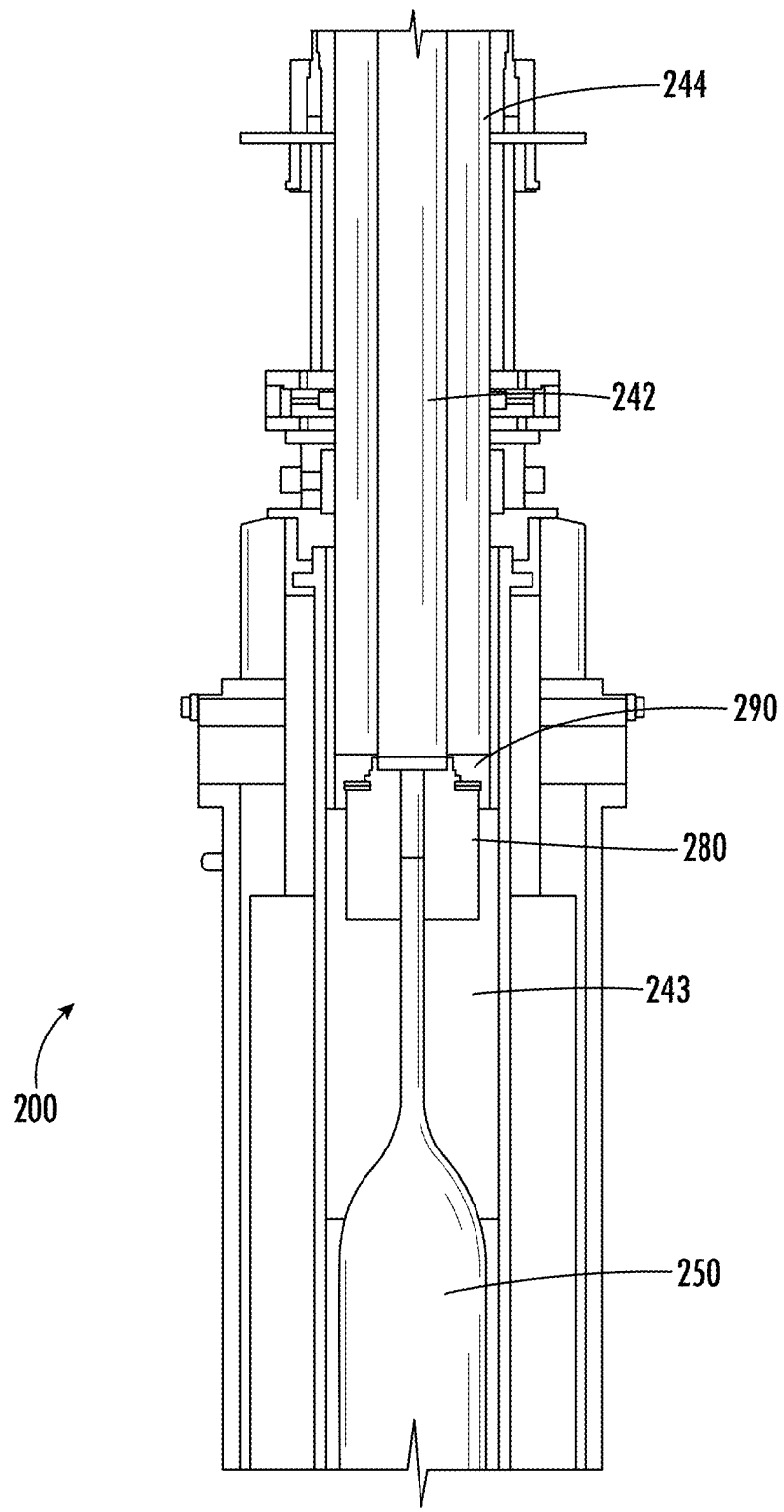
FIG. 4C is a cross-sectional view of the draw furnace assembly in the second position, according to embodiments of the present disclosure.

FIGS. 4A-4C depict a draw furnace system 200, according to embodiments of the present disclosure, in which downfeed handle 240 is connected to both a preform attachment member 280 and a downfeed handle extension portion 245. Thus, in these embodiments, preform attachment member 280 is a separate component from downfeed handle extension portion 245, and downfeed handle extension portion 245 comprises a shroud 243. Preform attachment member 280 is configured to support optical fiber preform 250 during a draw process, and may comprise a slot and/or boule, as discussed above. Furthermore, downfeed handle 240 and preform attachment member 280 are moveable together. However, in these embodiments, shroud 243 is moveable with respect to preform attachment member 280 such that shroud 243 is moveable from a first position, in which preform attachment member 280 is exposed (FIG. 4A) to a second position, in which preform attachment member 280 is covered (FIG. 4B). Thus, the first position of shroud 243 is disposed vertically above the second position of shroud 243 (along a longitudinal length of downfeed handle 240). Furthermore, as also shown in FIGS. 4A and 4B, the shoulder of preform 250 is covered by shroud 243 in the second position but is exposed and not covered by shroud 243 in the first position. As discussed further below, shroud 243 moves to the first position during a loading of preform 250 on preform attachment member 280 and moves to the second position during a draw process. When in the second position, the annular volume of space E' is reduced.

FIG. 4C depicts a cross-sectional view of system 200. As shown in this cross-sectional view, downfeed handle 240 comprises an inner handle 242 and an outer handle 244. Inner handle 242 is attached to preform attachment member 280 such that inner handle 242, preform attachment member 280, and preform 250 are moveable together. Furthermore, these components are moveable with regard to outer handle 244 and with regard to shroud 243. Outer handle 244 is moveable with shroud 243. A first connection 290 securely fastens outer handle 244 with shroud 243. Connection 290 may be a sealing member such as a gasket. It is noted that in FIG. 4C, shroud 243 is in the second position.

Shroud 243 is disposed radially outward of preform attachment member 280. In some embodiments shroud 243 and outer handle 244 have the same (or substantially the same) outer diameter, which may be in a range from about 5.0 inches to about 10 inches, or about 6 inches to about 9, or about 7 inches to about 8 inches. In some embodiments, the outer diameter is about 5.6 inches, or about 6.5 inches, or about 6.0 inches. However, it is also contemplated that shroud 243 and outer handle 244 have different outer diameters. In the embodiment of FIGS. 4A-4C, preform attachment member 280 has an outer diameter from about 5.0 inches to about 10 inches, or about 6 inches to about 9 inches, or about 7 inches to about 8 inches. In some embodiments, the outer diameter of preform attachment member 280 is about 5.5 inches, or about 6.5 inches, or about 5.9 inches. It is noted that the outer diameter of preform attachment member 280 is slightly smaller than the outer diameter of shroud 243.

Shroud 243 has a length ranging from about 10 inches to about 30 inches, or about 15 inches to about 25 inches, or about 20 inches to about 22 inches. In the embodiment of FIGS. 4A-4C, preform attachment member 280 has length ranging from about 3 inches to about 10 inches, or about 5 inches to about 7 inches.

A gap between an outer surface of shroud 243 and an inner surface of the muffle (shortest distance between these components) may have a length ranging from about 0.001 m to about 0.2 m, or about 0.005 m to about 0.15 m, or about 0.01 m to about 0.1 m, or about 0.03 m to about 0.08 m, or about 0.04 m to about 0.05 m.

In some embodiments, when shroud 243 is in the second position, as shown in FIGS. 4B and 4C, shroud 243 directly contacts the shoulder of preform 250. However, in other embodiments, shroud 243 does not contact preform 250 when in the second position. Thus, a radial gap exists between preform 250 and shroud 243, such that the radial gap is the minimum distance between an outer surface of preform 250 and an inner surface of shroud 243. This radial gap has a length ranging from about 1 mm to about 5 mm, or about 3 mm to about 4 mm. It is noted that in these embodiments, shroud 243 radially surrounds the shoulder of preform 250 when in the second position. Thus, shroud 243 extends in length beyond the shoulder of preform 250 when shroud 243 is in the second position. However, it is also contemplated that shroud 243 does not radially surround the shoulder of preform 250 when in the second position.

It is noted that the muffle and outer can of drawn furnace 200 are omitted in FIGS. 4A-4C for simplicity. However, space E' of these embodiments is still defined by the shoulder of preform 250, the inner wall of the muffle (not shown), and the bottom surface of support member 280. When shroud 243 is in the first position (FIG. 4A), the annular volume of space E' is relatively large. However, shroud 243 moves to the second position (FIGS. 4B and 4C), such as during a draw process, the annular volume of space E' is significantly reduced. In some embodiments, shroud 243 extends for the entire length of space E'. Thus, in some embodiments, shroud 243 occupies the entire volume of space E'. In these embodiments, shroud 243 radially surrounds the shoulder of preform 250 when in the second position, as discussed above.

However, in other embodiments, a gap exists between a bottom surface of shroud 243 and the shoulder of preform so that the shroud 243 terminates before the shoulder of preform 250. This gap is the minimum distance between the bottom surface of shroud 243 and the shoulder of preform 250 and is in a range from about 1 mm to about 50 mm, or about 5 mm to about 40 mm, or about 10 mm to about 30 mm, or about 20 mm to about 25 mm. In these embodiments, the annular volume of space E' is about 100 cubic inches or less, or about 75 cubic inches or less, or about 50 cubic inches or less, or about 25 cubic inches or less. Additionally or alternatively, the volume of space E' is about 10 cubic inches or greater, or about 20 cubic inches or greater, or about 30 cubic inches or greater, or about 40 cubic inches or greater, or about 50 cubic inches or greater. In some embodiments, the volume E' is in a range from about 25 cubic inches to about 75 cubic inches, or about 30 cubic inches to about 70 cubic inches, or about 40 cubic inches to about 60 cubic inches.

Figure 5:
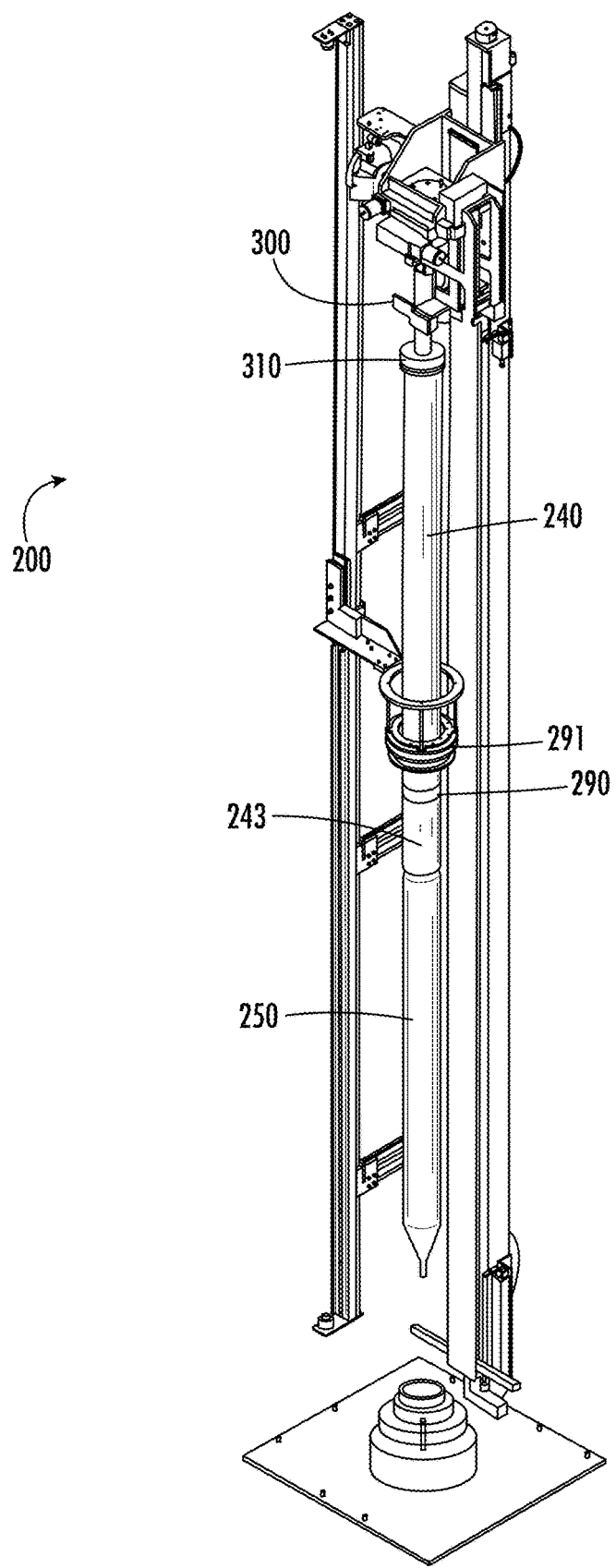
FIG. 5 is a schematic diagram illustrating a draw furnace assembly, according to embodiments of the present disclosure.

FIG. 5 shows an extended view of draw furnace 200 with shroud 243 in the second position. When in this second position, preform 250 is ready for a drawing process. However, before preform 250 is loaded onto preform attachment member 280, shroud 243 is first moved to its first position. When in this first position, preform attachment member 280 is exposed so that a user can easily attach preform 250 to preform attachment member 280. It is also noted that when shroud 243 is in the first position, in some embodiments, downfeed handle 240 and shroud 243 are not yet positioned within furnace 200. After preform 250 is secured to preform attachment member 280 and shroud 243 is moved to its second position, then the entire sub-system (comprised of downfeed handle 240, preform attachment member 280, and preform 250) is loaded into furnace 200. Second connection 291 creates a seal between furnace 200 and downfeed handle 240.

Figure 6:
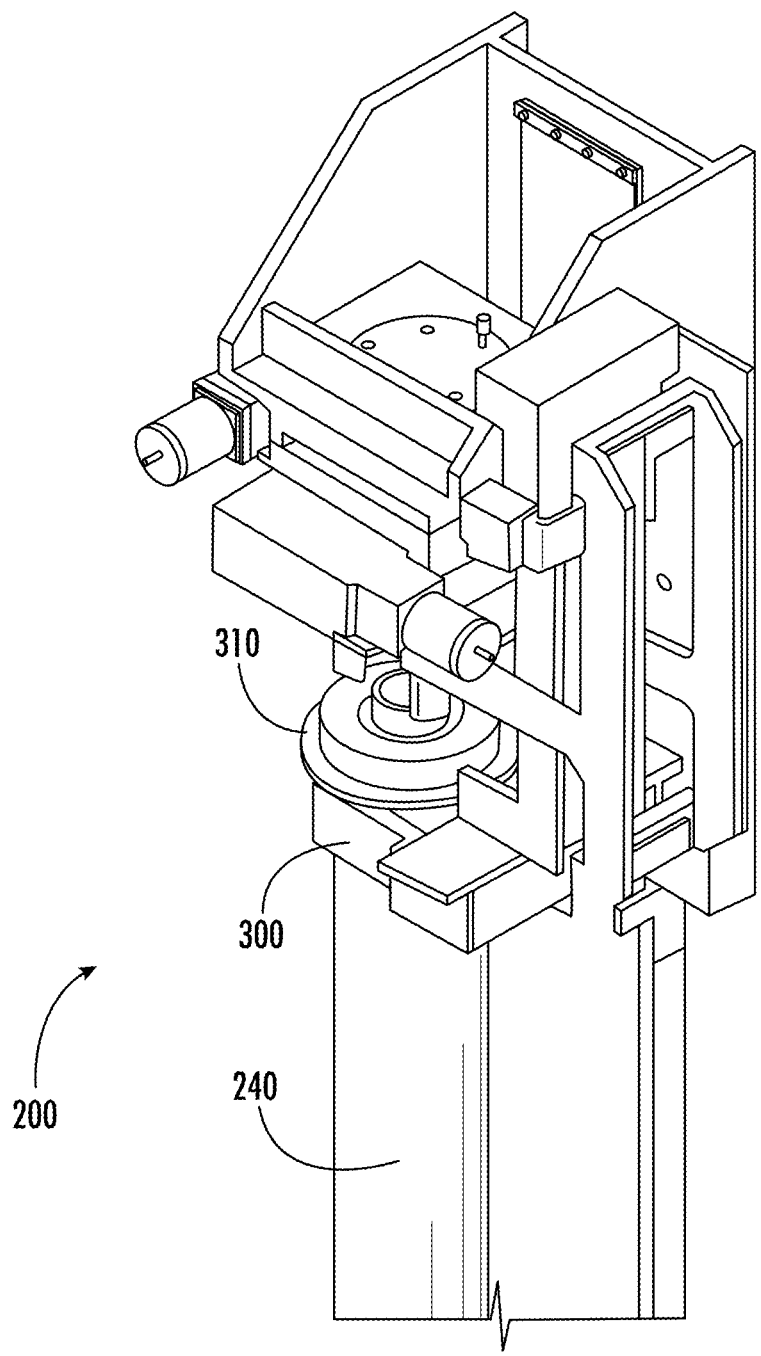
FIG. 6 is another schematic diagram illustrating a draw furnace assembly, according to embodiments of the present disclosure.

Shroud 243 moves between its first and second positions with a handle 300. As shown in FIG. 5, when shroud 243 is in the second position, handle 300 is not engaged with and is remotely disposed from a protrusion 310 of downfeed handle 240. With reference to FIG. 6, when shroud 243 is in the first position, handle 300 is engaged with and directly contacts protrusion 310. Handle 300 is able to move between engagement and disengagement with protrusion 310 via, for example, a user activated lever or actuator.

FIGS. 7-11 present results of computational fluid dynamic (CFD) simulations in terms of plots of gas flow and temperature within furnace assemblies (e.g., traditional draw furnace 10 and exemplary draw furnaces 100/200). The CFD simulations were validated using historical observations based on current production configurations to confirm their validity.

Figure 7:
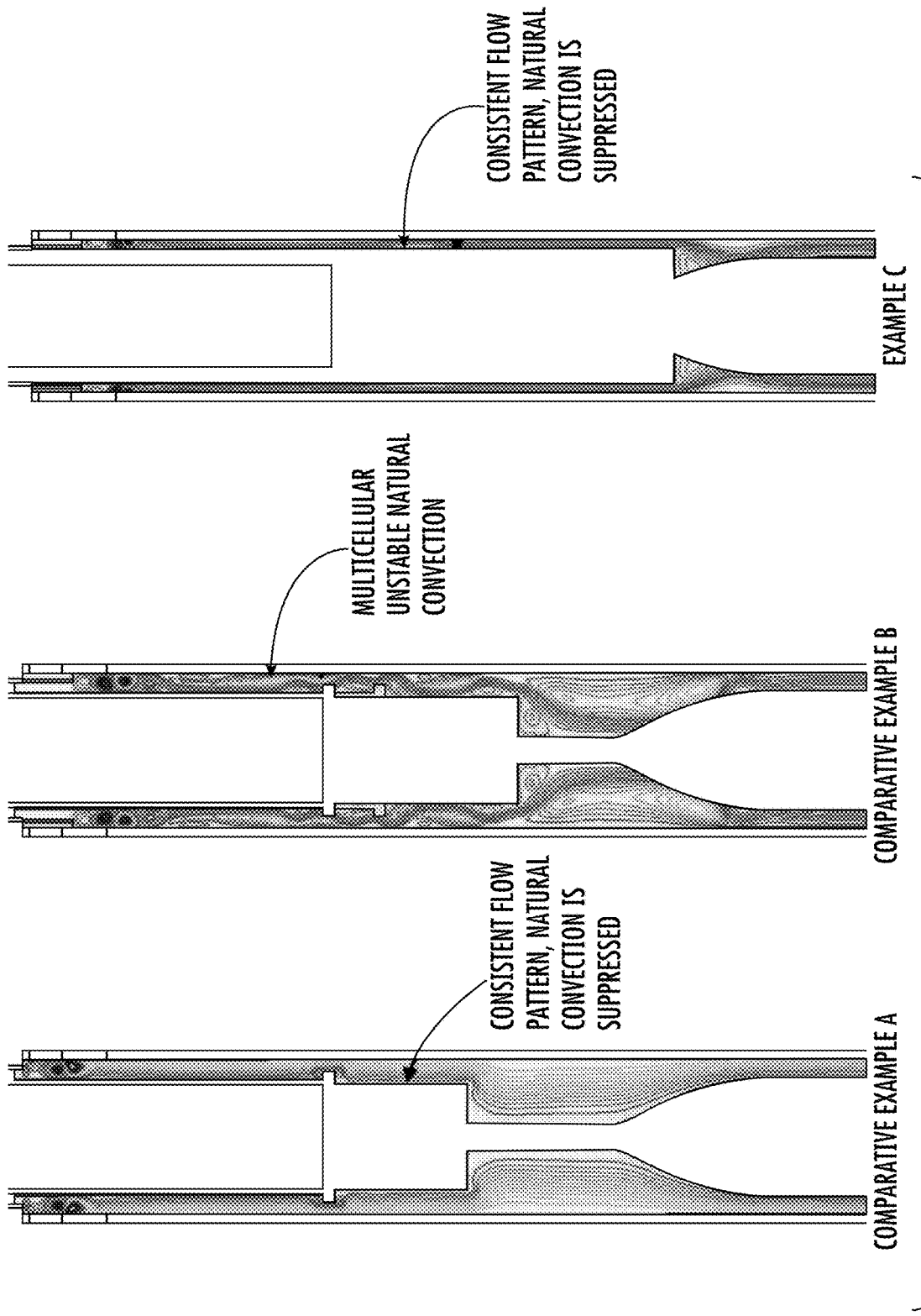
FIG. 7 illustrates gas flow contour plots of the process gas in the draw furnace assembly according to embodiments of the present disclosure and of comparative draw furnace assemblies.

Referring to FIG. 7, depicted are CFD models showing gas flow patterns for three examples during a drawing procedure. Specifically, Comparative Example A shows a model of a conventional draw furnace with a downfeed handle having an outer diameter of 4.87 inches and with helium as the process gas. Comparative Example B shows a model of the same conventional draw furnace with a downfeed handle having an outer diameter of 4.87 inches but with argon as the process gas. Example C shows a model of an exemplary draw furnace with a downfeed handle having an increased outer diameter and with argon as the process gas. More specifically, the downfeed handle of Example C has an outer diameter of 5.68 inches. Furthermore, Example C has a downfeed handle extension portion with an outer diameter of 5.68 inches and with a length of 12 inches. In all three examples, a lower heater heated a hot zone within an interior of the draw furnaces to a peak temperature of 2200° C. and a low temperature of 1800° C. (as moving further from the lower heater). The upper part of the draw furnace was not actively heated in the examples. The embodiments of the present disclosure are able to achieve stable convection without the need to actively heat the upper part of the draw furnace.

In Comparative Example B of FIG. 7, which uses a traditional draw furnace and argon as the process gas, a multi-cellular buoyancy-driven flow pattern is established in the annular space between the downfeed handle and the muffle, as well as between the support member and the muffle. More specifically, the flow of the process gas is unstable and time variant, resulting in temperature and pressure fluctuations within the annular space. Comparative Example A, which also uses a traditional draw furnace but uses helium as the process gas, has consistent gas flow with only two small recirculation vortices formed near the inlet of the gas due to the gas entering the furnace perpendicular to the wall. Thus, Comparative Example A provides a stable, time invariant, flow of process gas. Similar to Comparative Example A, Example C also provides a stable flow of process gas. However, Example C is able to achieve the stable flow when using argon as the process gas by reducing the annular volume within the muffle. More specifically, FIG. 7 shows that the buoyant flow of Example C is stable and temperature fluctuations are suppressed.

Figure 8:
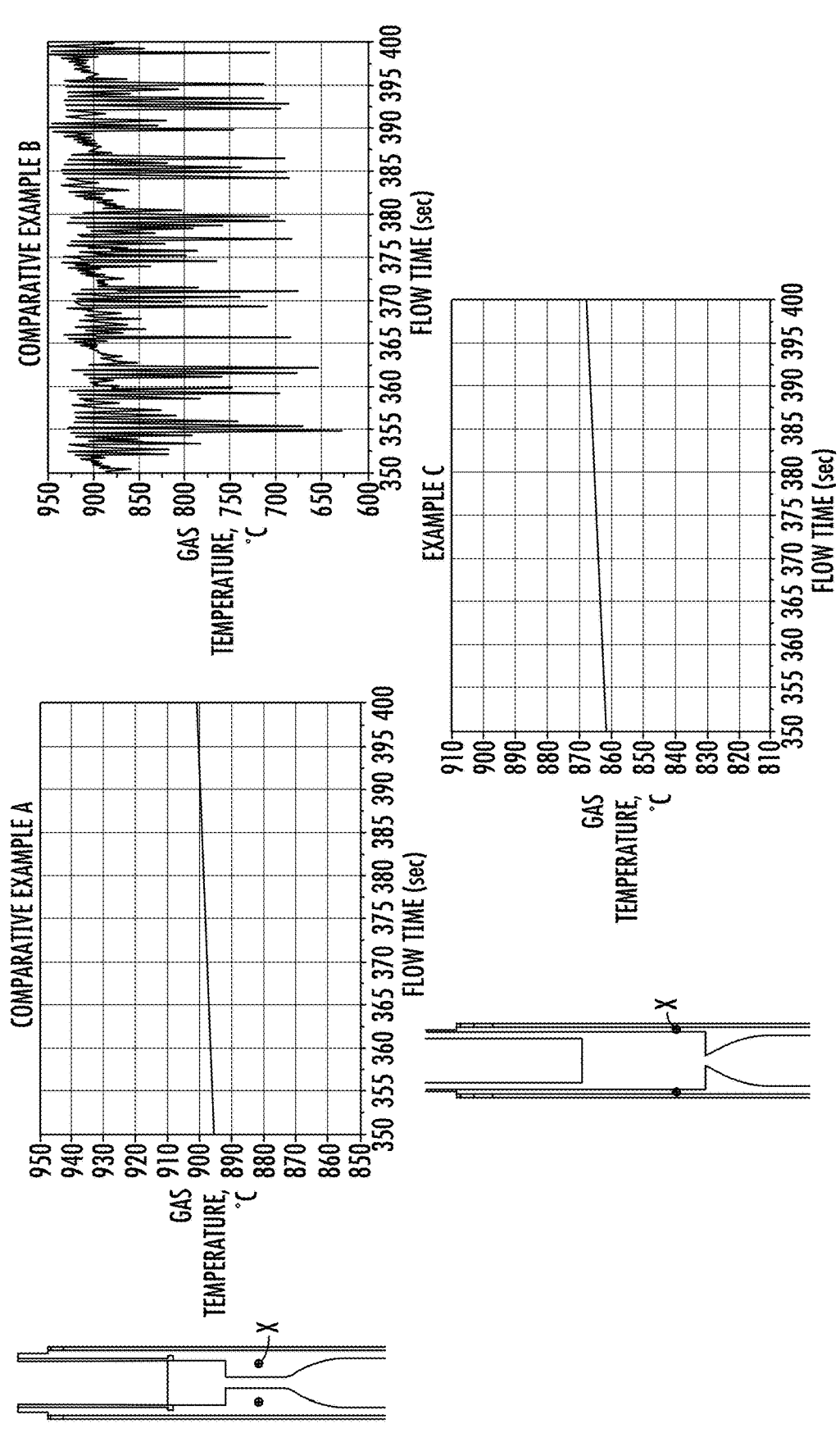
FIG. 8 illustrates plots of temperature vs. time in a portion of the draw furnace assembly according to embodiments of the present disclosure and of comparative draw furnace assemblies.

FIG. 8 shows a plot of gas temperature as a function of time at location X for Comparative Examples A and B and Example C. Comparative Example A, which uses a conventional draw furnace and helium as the process gas, has a relatively stable temperature plot. Similarly, Example C, which uses an exemplary draw furnace and argon as the process gas, has a relatively stable temperature plot. However, Comparative Example B, which uses a traditional draw furnace and argon as the process gas, has a relatively unstable temperature plot. Comparative Example B has large temperature fluctuations ranging from about 650-950° C.

Figure 9:
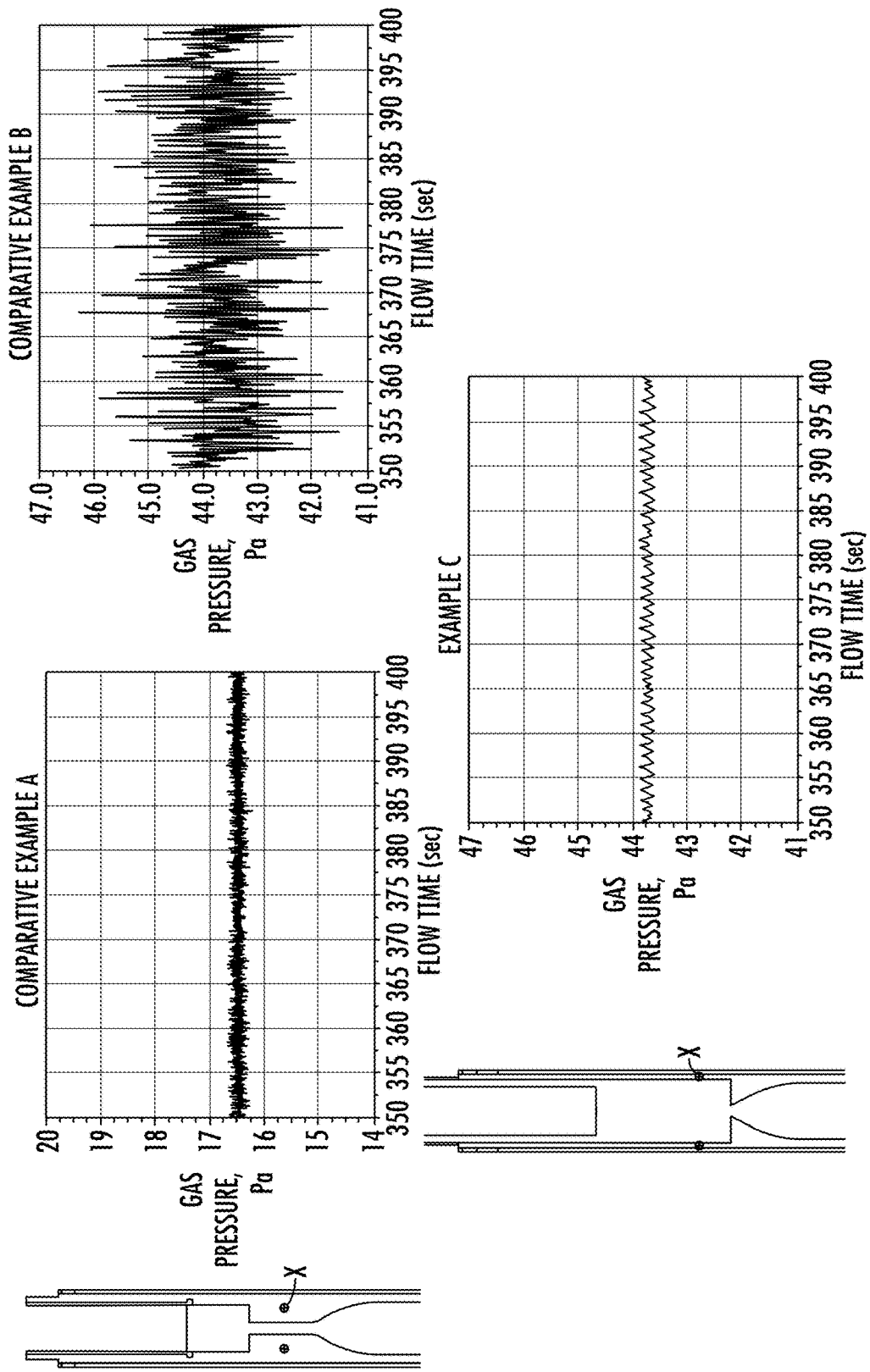
FIG. 9 illustrates plots of gas pressure vs. time in the portion of the draw furnace assembly according to embodiments of the present disclosure and of comparative draw furnace assemblies.

FIG. 9 shows a plot of gas pressure as a function of time at location X for Comparative Examples A and B and Example C. Similar to the temperature plots discussed above, Comparative Example A and Example C have relatively stable gas pressures at location X. Conversely, Comparative Example B has a relatively unstable gas pressure at location X.

Figure 10:
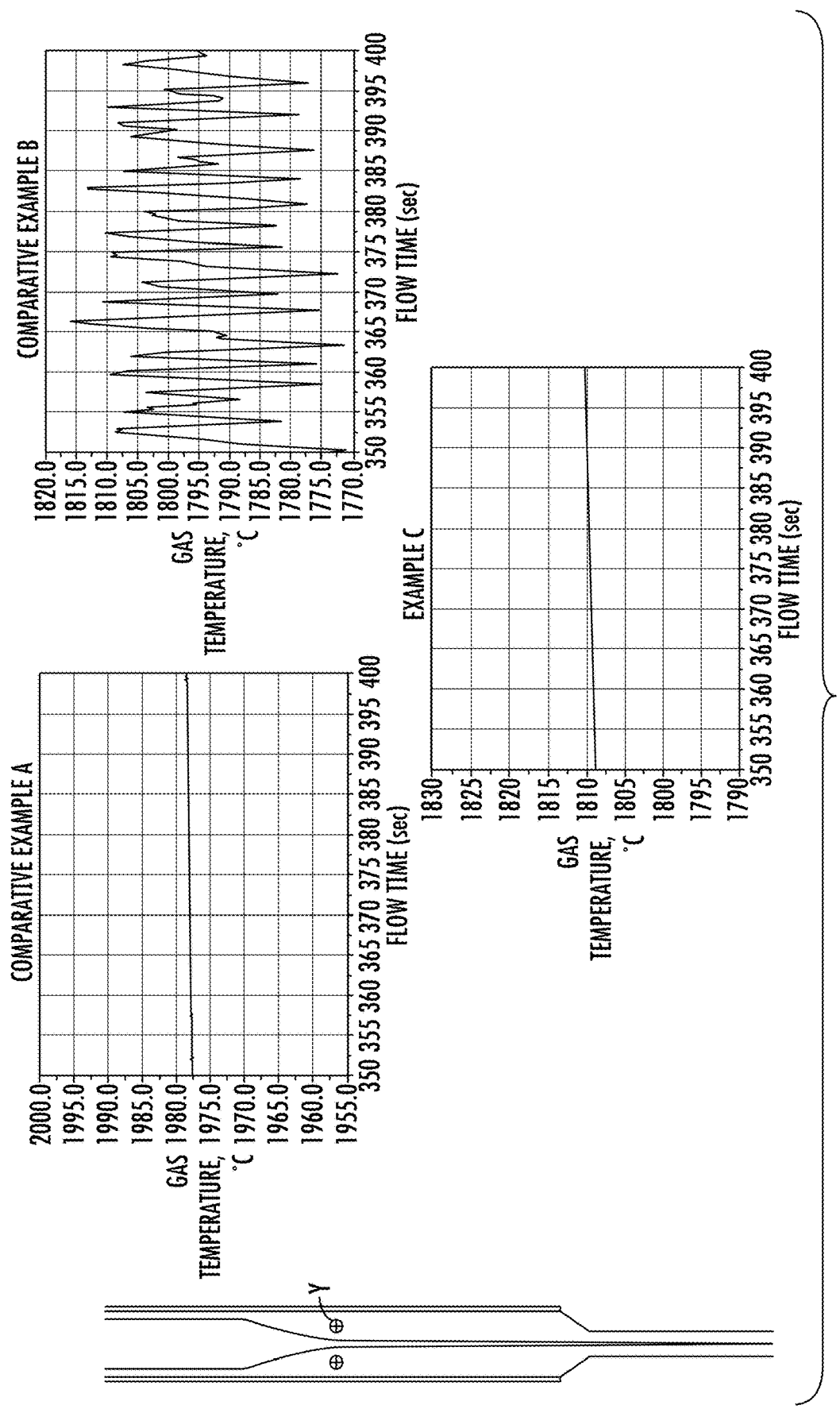
FIG. 10 illustrates plots of temperature vs. time in the preform neckdown region of the draw furnace assembly according to embodiments of the present disclosure and of comparative draw furnace assemblies.

As discussed above, the temperature and gas fluctuations are propagated downward within a muffle to a neckdown region of a preform. FIG. 10 shows a plot of gas temperature as a function of time at location Y (near the neckdown region of the preform) for Comparative Examples A and B and Example C. Due to the use of helium, Comparative Example A has a relatively stable non-fluctuating temperature plot at location Y. Due to the reduction in annular volume of its draw furnace, Example C also has a relatively stable non-fluctuating temperature plot at location Y. However, Comparative Example B has a relatively unstable temperature plot at location Y, with temperatures fluctuating from about 1771° C. to about 1816° C. over a 50 second interval.

Figure 11:
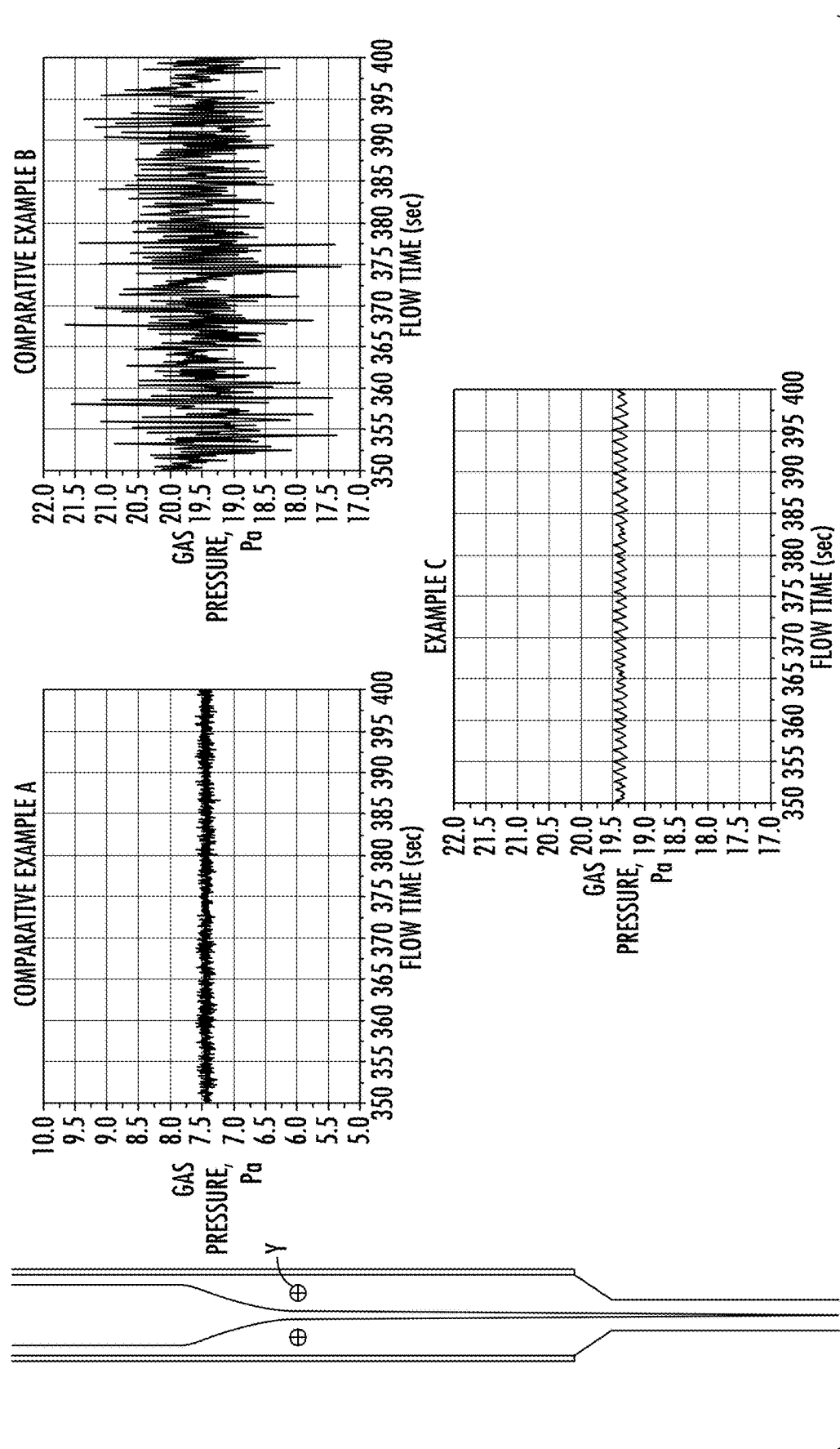
FIG. 11 illustrates plots of gas pressure vs. time in the preform neckdown region of the draw furnace assembly according to embodiments of the present disclosure and of comparative draw furnace assemblies.

FIG. 11 shows a plot of gas pressure as a function of time at location Y for Comparative Examples A and B and Example C. Similar to FIG. 9, Comparative Example A and Example C have relatively stable gas pressures, while Comparative Example B has a fluctuating gas pressure.

Figure 12:
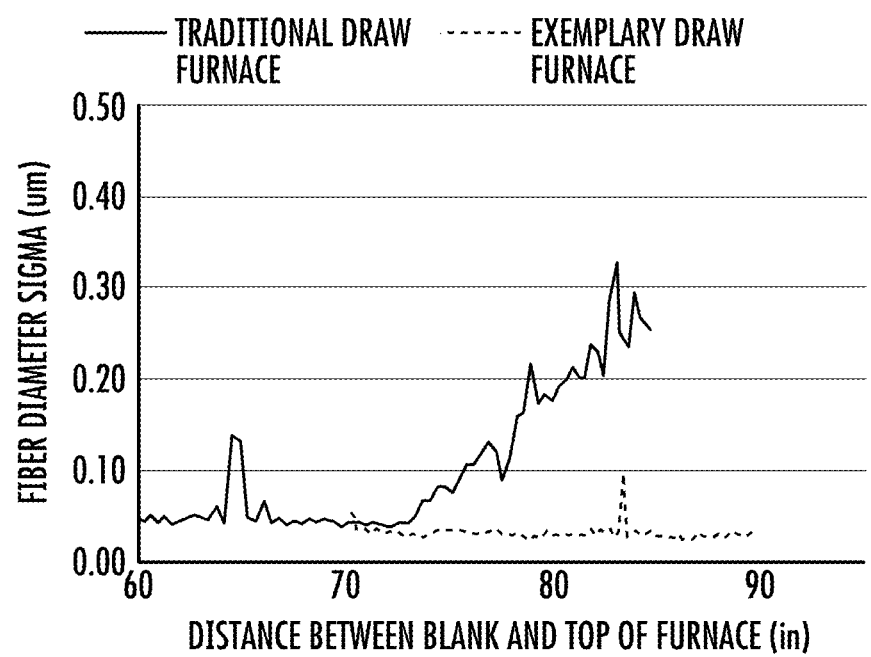
FIG. 12 illustrates a plot of distance between a preform and the top of the furnace vs. variation in the drawn optical fiber.

FIG. 12 shows a plot of the distance between the shoulder of a preform and the top of the furnace (i.e., where the muffle is sealed to the top of the furnace) vs. the fiber diameter standard deviation of a drawn optical fiber in a traditional draw furnace and in an exemplary draw furnace (as disclosed herein). It is noted that the during the draw process, the preform is consumed, which increases the distance between the shoulder of the preform and the top of the furnace. In the traditional draw furnace, when the distance exceeds about 75 inches, the standard deviation in the drawn optical fiber becomes increasingly high. However, the standard deviation in the exemplary draw furnace remains at acceptable levels even when the distance increases.

As discussed above, the optical fiber draw furnace disclosed herein advantageously allows process gases with lower kinematic viscosity (such as nitrogen or argon) to be used while still providing a drawn optical fiber with a constant and uniform diameter.

While various embodiments have been described herein, they have been presented by way of example only, and not limitation. It should be apparent that adaptations and modifications are intended to be within the meaning and range of equivalents of the disclosed embodiments, based on the teaching and guidance presented herein. It therefore will be apparent to one skilled in the art that various changes in form and detail can be made to the embodiments disclosed herein without departing from the spirit and scope of the present disclosure. The elements of the embodiments presented herein are not necessarily mutually exclusive, but may be interchanged to meet various needs as would be appreciated by one of skill in the art.

It is to be understood that the phraseology or terminology used herein is for the purpose of description and not of limitation. The breadth and scope of the present disclosure should not be limited by any of the above-described exemplary embodiments, but should be defined only in accordance with the following claims and their equivalents.

What is claimed is:

1. An optical fiber draw furnace system comprising:
   a muffle forming an inner cavity;
   a downfeed handle moveably disposed within the inner cavity and comprising an inner handle and an outer handle, and
   a downfeed handle extension portion connected to the downfeed handle and moveably disposed within the inner cavity,
   the downfeed handle extension portion being moveable with the outer handle with respect to the inner handle,
   a length of the downfeed handle extension portion being in a range from about 2 inches to about 25 inches,
   the downfeed handle extension portion formin a first gap between an outer surface of the downfeed handle extension portion and an inner surface of the muffle, the first gap having a length in a range of about 0.001 m to about 0.2 m, and
   the downfeed handle extension portion configured to form a second gap between a lower surface of the downfeed handle extension portion and a shoulder of a preform attached to the downfeed handle extension portion, the second gap having a length in a range from about 0.001 m to about 0.2 m.

2. The optical fiber draw furnace system of claim 1, wherein the downfeed handle extension portion is a support member configured to directly connect to an optical fiber preform.

3. The optical fiber draw furnace system of claim 1, wherein the downfeed handle extension portion radially surrounds a preform attachment member, the preform attachment member being configured to directly connect to an optical fiber preform.

4. The optical fiber draw furnace system of claim 1, wherein the length of the first gap is in a range of about 0.005 m to about 0.15 m.

5. The optical fiber draw furnace system of claim 1, wherein an outer diameter of the downfeed handle is equal to an outer diameter of the downfeed handle extension portion.

6. The optical fiber draw furnace system of claim 1, wherein the downfeed handle forms a second gap between an outer surface of the downfeed handle and the inner surface of the muffle, the second gap having a length in a range of about 0.001 m to about 0.2 m.

7. The optical fiber draw furnace system of claim 6, wherein the length of the second gap is in a range of about 0.005 m to about 0.15 m.

8. The optical fiber draw furnace system of claim 1, further comprising a lower heater disposed within the furnace, the downfeed handle and the downfeed handle extension portion being moveable relative to the lower heater.

9. The optical fiber draw furnace system of claim 1, further comprising a process gas disposed within the muffle, the process gas comprising at least one of nitrogen gas and argon gas.

10. The optical fiber draw furnace system of claim 1, further comprising a preform connected to the downfeed handle extension portion.

11. The optical fiber draw furnace system of claim 10, wherein the downfeed handle extension portion forms the second gap between the lower surface of the downfeed handle extension portion and the shoulder of the preform.

12. The optical fiber draw furnace system of claim 11, wherein the length of the second gap is in a range from about 0.005 m to about 0.15 m.

13. An optical fiber draw furnace system comprising:
    a muffle forming an inner cavity;
    a downfeed handle moveably disposed within the inner cavity and comprising an inner handle and an outer handle;
    a preform attachment member connected to the downfeed handle and configured to directly connect to an optical fiber preform; and
    a downfeed handle extension portion disposed radially outward of the preform attachment member, the downfeed handle extension portion being moveable with the outer handle and being moveable with respect to the preform attachment member from a first position, in which at least a bottom portion of the preform attachment member is exposed and not covered by the downfeed handle extension portion, to a second position, in which the bottom portion of the preform attachment member is radially covered by the downfeed handle extension portion.

14. The optical fiber draw furnace system of claim 13, wherein the downfeed handle extension portion has a longer length than the preform attachment member.

15. The optical fiber drawn furnace system of claim 13, wherein an outer diameter of the downfeed handle extension portion is equal to an outer diameter of the downfeed handle.

16. An optical fiber draw furnace system comprising:
    a muffle forming an inner cavity;
    a downfeed handle moveably disposed within the inner cavity; and
    a preform attachment member connected to the downfeed handle and configured to connect to an optical fiber preform; and
    a downfeed handle extension portion connected to the downfeed handle and moveably disposed within the inner cavity,
    the downfeed handle extension portion being moveable with respect to the preform attachment member from a first position, in which at least a bottom portion of the preform attachment member is exposed and not covered by the downfeed handle extension portion, to a second position, in which the bottom portion of the preform attachment member is radially covered by the downfeed handle extension portion,
    a length of the downfeed handle extension portion being in a range from about 2 inches to about 25 inches, and
    the downfeed handle extension portion forming a first gap between an outer surface of the downfeed handle extension portion and an inner surface of the muffle, the first gap having a length in a range of about 0.001 m to about 0.2 m.

* * * * *